(12) United States Patent
Knittel et al.

(10) Patent No.: US 11,604,835 B2
(45) Date of Patent: Mar. 14, 2023

(54) USER INTERFACES FOR SELECTING MEDIA ITEMS

(71) Applicant: Canva Pty Ltd, Surry Hills (AU)

(72) Inventors: Paul Karl Knittel, Bondi (AU); Elijah Alexander Sheppard, Coogee (AU); Yu Su, Gordon (AU); Denis Chashchin, Cammeray (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/548,525

(22) Filed: Dec. 11, 2021

(65) Prior Publication Data
US 2022/0197956 A1 Jun. 23, 2022

(30) Foreign Application Priority Data
Dec. 18, 2020 (AU) .................................. 2020289873

(51) Int. Cl.
*G06F 16/90* (2019.01)
*G06F 16/903* (2019.01)
*G06F 16/904* (2019.01)
*G06F 3/0482* (2013.01)
*G06F 3/04883* (2022.01)

(52) U.S. Cl.
CPC ...... *G06F 16/90348* (2019.01); *G06F 3/0482* (2013.01); *G06F 3/04883* (2013.01); *G06F 16/904* (2019.01)

(58) Field of Classification Search
CPC ....................... G06F 16/90348; G06F 16/0482
See application file for complete search history.

(56) References Cited

U.S. PATENT DOCUMENTS

2012/0030623 A1 2/2012 Hoellwarth
2017/0031563 A1 2/2017 Zhang et al.
2017/0212667 A1\* 7/2017 Miyazaki .......... H04M 1/72469

\* cited by examiner

*Primary Examiner* — Baoquoc N To
(74) *Attorney, Agent, or Firm* — GrowIP Law Group LLC

(57) ABSTRACT

Described herein is a computer implemented method, a computer processing system, and a non-transitory computer-readable storage medium. The method includes displaying a first set of media item representations in a media item order in an initial media selection interface. While the initial media selection interface is displayed, the method further comprises detecting a display complete media set at reference input and, in response: determining a reference media item representation and displaying a complete media selection interface in a first initial display state which is based on the reference media item representation.

18 Claims, 6 Drawing Sheets

USER INTERFACES FOR SELECTING MEDIA ITEMS

CROSS-REFERENCE TO RELATED APPLICATION

This application is a U.S. Non-Provisional application that claims priority to Australian Patent Application No. 2020289873, filed Dec. 18, 2020, which is hereby incorporated by reference in its entirety.

FIELD

The present disclosure is directed to user interfaces for selecting media items.

BACKGROUND

Many electronic devices provide functionality for users to store media items such as photographs, videos, and other media items.

Such electronic devices also run applications which make use of or provide functionality associated with stored media items. The use of such applications typically involves browsing through stored media items to select one or more of the media items for use by the application—for example to include in an electronic communication, to edit, to use in designing and/or publishing content.

SUMMARY

Described herein is a computer implemented method comprising: accessing a set of media items having a media item order; displaying, in an initial media selection interface, a first plurality of media item representations in the media item order, the first plurality of media item representations taken from a first set of media item representations, each media item representation in the first set of media item representations corresponding to a media item from the set of media items; while the initial media selection interface is displayed: detecting a representation transition input; in response to detecting the representation transition input, replacing display of the first plurality of media item representations with display of a second plurality of media item representations in the initial media selection interface, the second plurality of media item representations taken from the first set of media item representations; detecting a display complete media set at reference input; and in response to detecting the display complete media set at reference input: determining a reference media item representation; and displaying a complete media selection interface in a first initial display state, the complete media selection interface for displaying a second set of media item representations, the second set of media item representations displayed in the media item order and including media item representations corresponding to all media items in the set of media items, the first initial display state being a display state in which an initially displayed plurality of the second set of media item representations is based on the reference media item representation.

Figure 1:
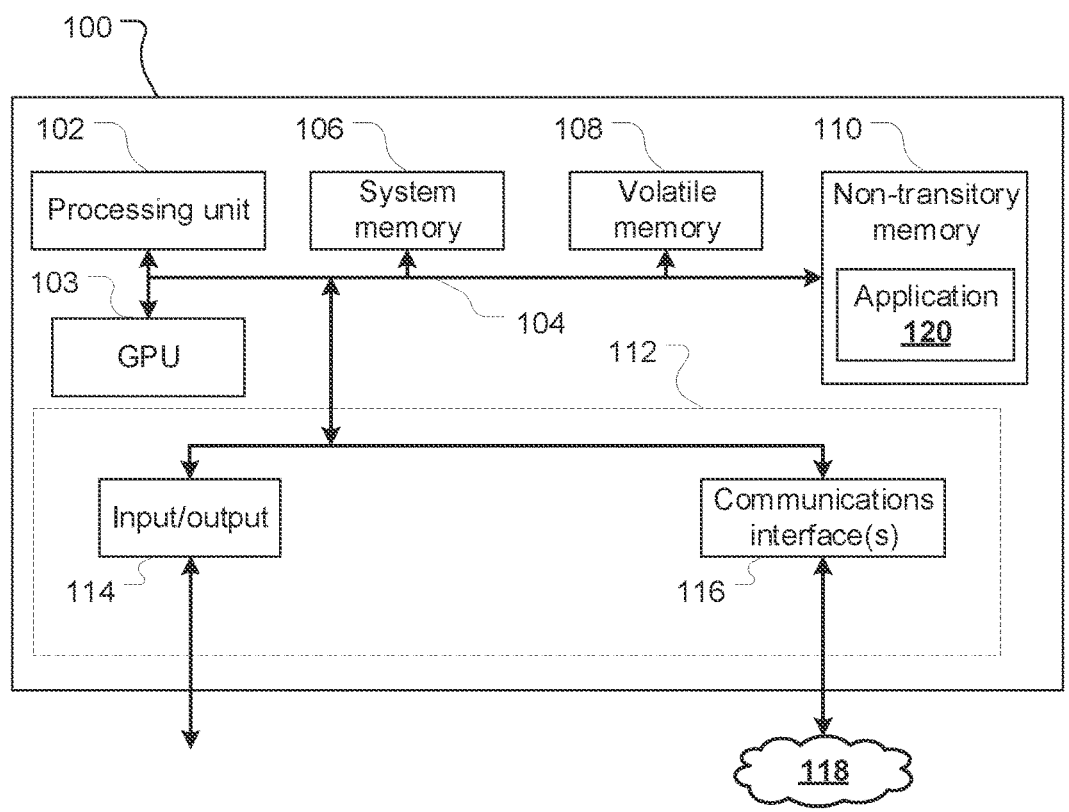
FIG. 1 is a block diagram of an example computer processing system configurable to perform various features described herein.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As described above, many electronic devices allow users to store media items. By way of example, a typical smart phone device will have a camera which a user can take photos and videos with. Those photos and videos are then stored on the device. A user of such a device may also receive media items from friends or other contacts, download media items from remote sources (e.g. from web pages), or otherwise import media items to their device.

A typical smart phone device will also have various applications installed thereon that make use of media items. Such applications will typically provide or make use of a media selection user interface which a user can interact with to select media items from those stored on the device. For example, communications applications (such as email, instant messaging, sms, and other communications applications) provide or make use of media selection user interfaces to allow a user to select a media item for inclusion in/attachment to an electronic communication. As another example, content creation and design type application will typically provide or make use of media selection user interfaces to allow a user to select a media item to be used by the application (e.g. to be edited, used in the creation of a new design, or otherwise used).

The present disclosure provides a media selection user interface which can be used to browse through and select media items.

The features and techniques described herein are particularly suitable for portable electronic devices such as smart phones and the like which have a relatively small screen size (when compared, for example, to laptop or desktop computers). The features and techniques described herein can, however, be used/adapted for use with other types of devices, e.g. desktop computers, laptop computers, set-top boxes, etc.

The features and techniques described herein are also particularly suitable for devices with touchscreen displays—again, for example, smart phones and the like which have a touchscreen display. The features and techniques described herein can, however, be used/adapted for use with devices having other input mechanism (e.g. keyboards, mice/pointing devices, other inputs).

The features and techniques described herein are particularly suitable for visual media items, such as images (e.g. photographs) and videos. The features and techniques described herein can, however, be used/adapted for use with other types of media items, e.g. audio media items (such as voice recordings, songs, etc.).

In light of the above, the specific embodiments will be described in the context of a media selection user interface operating on a touchscreen portable electronic device for selecting visual media items. It will be appreciated, though, that alternative embodiments are possible.

Example Computer Processing System

FIG. 1 provides a block diagram of a computer processing system 100 configurable to implement embodiments and/or features described herein. It will be appreciated that FIG. 1 does not illustrate all functional or physical components of a computer processing system. For example, no power supply or power supply interface has been depicted, however system 100 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 100 includes at least one computer processing unit 102 (e.g. a central processing unit or other computer processing unit). In some instances, computer processing system 100 may include one or more additional processing units (e.g. one or more graphics processing units 103 and/or other processing units).

Through a communications bus 104 the general processing unit 102 (and, where present, graphics processing unit 103) is in data communication with a one or more machine readable storage (memory) devices which store instructions and/or data for controlling operation of the processing system 100. In this example system 100 includes a system memory 106 (e.g. a BIOS), volatile memory 108 (e.g. random access memory such as one or more DRAM modules), and non-transitory (or non-volatile) memory 110 (e.g. one or more hard disk or solid state drives, memory chips such as NAND chips, and/or other non-transitory memory devices).

System 100 also includes one or more interfaces, indicated generally by 112, via which system 100 interfaces with various devices and/or networks. Generally speaking, other devices may be integral with system 100, or may be separate. Where a device is separate from system 100, connection between the device and system 100 may be via wired or wireless hardware and communication protocols, and may be a direct or an indirect (e.g. networked) connection.

Wired connection with other devices/networks may be by any appropriate standard or proprietary hardware and connectivity protocols. For example, system 100 may be configured for wired connection with other devices/communications networks by one or more of: USB; eSATA; Thunderbolt; Ethernet; HDMI; DisplayPort. Other wired connections are possible.

Wireless connection with other devices/networks may similarly be by any appropriate standard or proprietary hardware and communications protocols. For example, system 100 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

System 100 includes one or more input/output interfaces 114 for connecting to/communicating with input and/or output devices. Generally speaking, and depending on the particular system in question, devices to which system 100 connects—whether by wired or wireless means—include one or more input devices to allow data to be input into/received by system 100 for processing by the processing unit 102, and one or more output device to allow data to be output by system 100. Example devices are described below, however it will be appreciated that not all computer processing systems will include all mentioned devices, and that additional and alternative devices to those mentioned may well be used.

For example, system 100 may include or connect to one or more input devices by which information/data is input into (received by) system 100. Such input devices may include keyboards, mice, trackpads, microphones, accelerometers, proximity sensors, GPS devices, camera/image capture devices and the like. System 100 may also include or connect to one or more output devices controlled by system 100 to output information. Such output devices may include devices such as LCD displays, LED displays, QLED displays, plasma displays, touchscreen displays, speakers, vibration modules, LEDs/other lights, and such like. System 100 may also include or connect to devices which may act as both input and output devices, for example memory devices (hard drives, solid state drives, disk drives, compact flash cards, SD cards and the like) which system 100 can read data from and/or write data to, and touchscreen displays which can both display (output) data and receive touch signals (input).

System 100 also includes one or more communications interfaces 116 for communication with a network 118 such as the Internet. Via the communications interface(s) 116 system 100 can communicate data to and receive data from networked devices, which may themselves be other computer processing systems.

System 100 stores or has access to computer applications (also referred to as software or programs)—i.e. computer readable instructions and data which, when executed by the processing unit 102, configure system 100 to receive, process, and output data. Instructions and data can be stored on non-transitory machine readable medium accessible to system 100. For example, instructions and data may be stored on non-transitory memory 110. Instructions and data may be transmitted to/received by system 100 via a data signal in a transmission channel enabled (for example) by a wired or wireless network connection over a communications interface such as 116.

Applications accessible to system 100 will typically include an operating system application such as Microsoft Windows, Apple macOS, Apple iOS, Android, Unix, or Linux.

System 100 also stores or has access to one or more applications (such as application 120) which, when executed by the processing unit 102, configure system 100 to perform various computer-implemented processing operations described herein.

System 100 may be any suitable computer processing system, for example, a server computer system, a desktop computer, a laptop computer, a netbook computer, a tablet computing device, a mobile/smart phone, a personal digital assistant, or an alternative computer processing system.

Example Portable Electronic Device

As noted above, in certain embodiments the computer processing system 100 may be a portable electronic device such as a smartphone, tablet computer, or the like.

Figure 2:
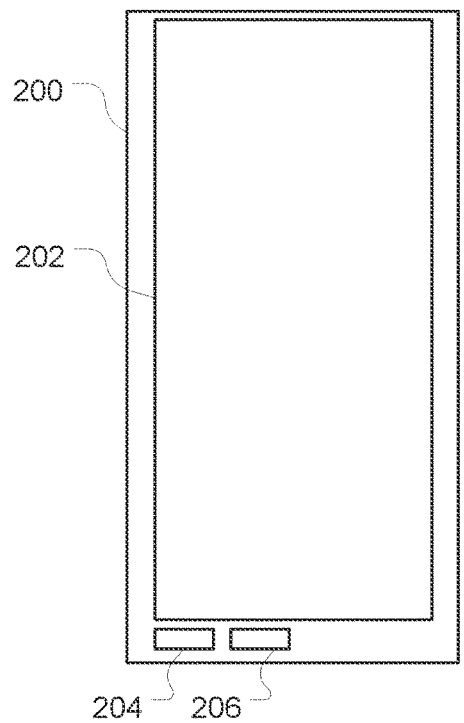
FIG. 2 depicts a portable electronic device.

FIG. 2 depicts a portable electronic device 200, which is one example of a computer processing system 100.

In this example, device 200 includes a touchscreen display 202 which acts as both an input device (receiving inputs via contacts made with the display 202) and output device (by displaying information/data). Device 200 may also include additional input devices in the form of one or more physical buttons 204 and 206. Portable electronic device 200 may also include additional output devices, such as speakers, vibration modules, and/or other output devices. Portable electronic device may also include additional input devices such as cameras, microphones, accelerometers, and/or other input devices.

In other embodiments, computer processing system 100 may be a laptop or desktop (or other) type of computing device and have additional/alternative input devices such as a keyboard and/or mouse and/or additional/alternative output devices such as one or more displays (touchscreen or otherwise).

Media Items and Media Item Sets

Computer processing system 100 stores one or more media items using, for example, non-transitory memory such as 110.

Media items stored by system 100 may be media items (such as photos or videos) that have been captured by a camera of the system 100, media items that have been received from other devices (e.g. in emails, instant messages, SMSs, shared folders, or via other media item sharing mechanisms), media items that have been downloaded from other sources (e.g. web pages, via network such as 118), and/or media items that have been received at/captured by system 100 in other ways.

Media items may be stored or grouped by system 100 (or applications running therein) in a single set. Alternatively, media items may grouped (by system 100 and/or applications) into multiple media item sets. Different sets of media items may be created, for example, by one or more of: storing media items in different physical folders; associating media items with different logical media item folders (e.g. a recent items folder, a favourites folder, a holidays folder, and/or any other folder); associating media items with different keywords, classifications, tags, or other metadata. Where a media items are grouped via logical groupings a single media item may belong to multiple sets.

Media items stored in a media item set have a media item order. The media item order may be based on metadata associated with the media items. In the described embodiments, the media item order is reverse chronological order based on timestamp metadata associated with the media items (for example the data a photograph or video was taken). In reverse chronological order, more recent media items (those with later timestamps) occur earlier in the order while older media items (those with earlier timestamps) occur later in the order. Alternative media item orders are, however, possible, for example alphabetical order.

For clarity, the suffix '-in-order' will be used where a media item's position (or a media item representation's position) in the media item order is being referred to. I.e. where the media item order is reverse chronological order: the media item with the most recent time-stamp will be the first-in-order media item; the media item with the oldest time-stamp will be the last-in-order media item.

Media items have corresponding media item representations (also referred to as representations for short). In the present embodiments, a representation is a thumbnail—e.g. a small graphic (e.g. image or icon) that represents the media item it corresponds to. Where a media item is an image (e.g. a photograph or other picture), its corresponding representation will typically be a small/low resolution version of the image. Where a media item is a video or animation, its corresponding representation will typically be a small/low resolution version of a frame of the video/animation (e.g. the first frame thereof). In embodiments which involve non-graphic media items various representations can be used. For example, an audio media item (e.g. a voice recording, song, or other audio item) may have a generic representation with an icon or text indicating it is an audio media item (e.g. a musical note or the like) or a specific image generated, for example, based on part of the waveform of the audio item.

Media item representations may be generated by an application running on system 100 and persistently stored with the media items (e.g. in memory 110). Alternatively, representations may be generated by an application running on system 100 only when they need to be displayed (and not persistently stored).

Initial Media Item Selection Interface

Figure 3:
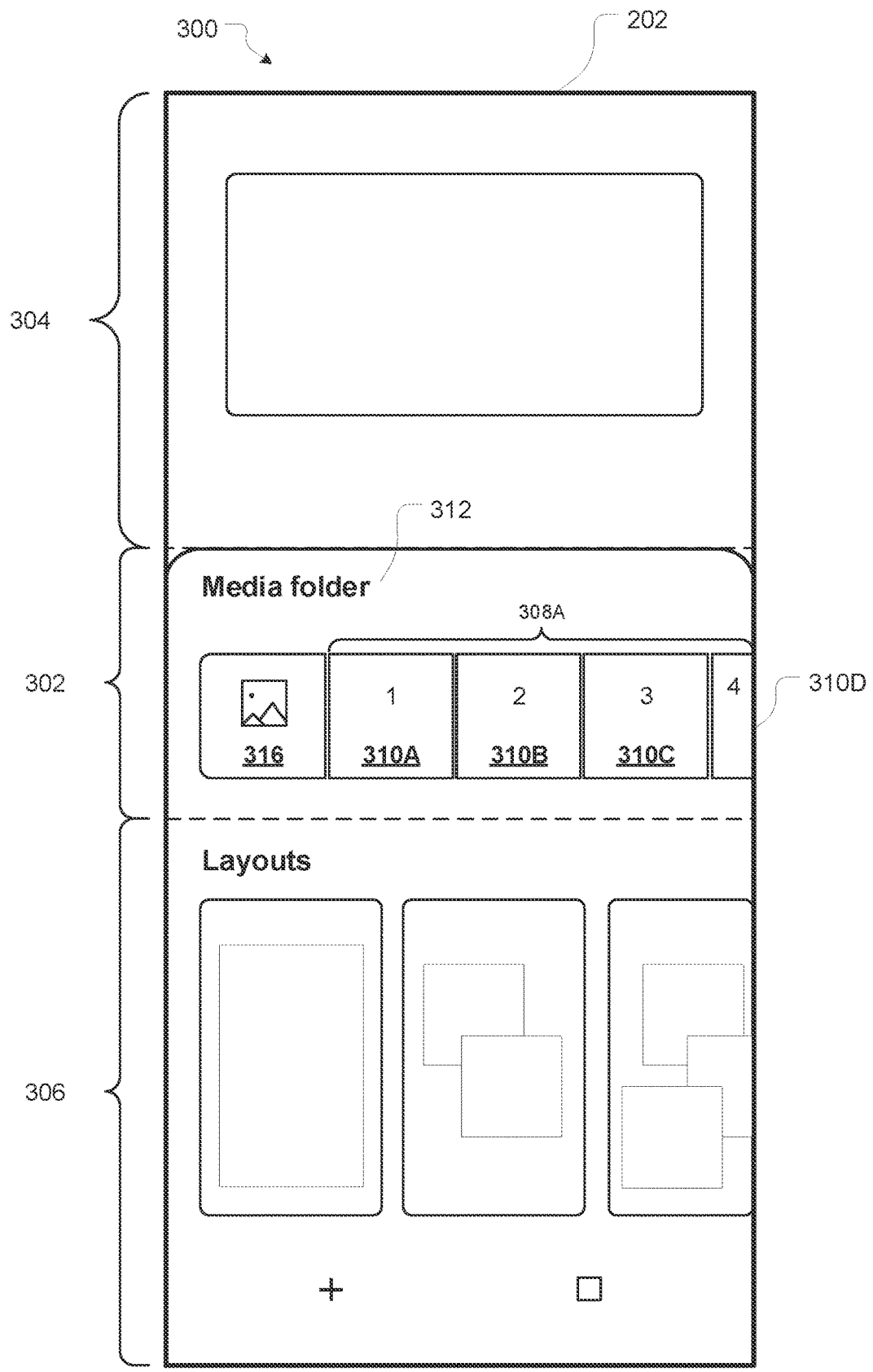
FIG. 3 depicts an example user interface including an initial media selection interface.

Turning to FIG. 3, an example user interface (UI) 300 will be described.

UI 300 is generated by an application such as 120 running on a computer processing system 100. The computer processing system 100 may be a device such as portable electronic device 200 described above, the UI 300 displayed (in this example) on a touchscreen display 202.

In this example, UI 300 is divided into three general areas: an initial media selection interface 302, a first application display area 304, and a second application display area 306.

Application display areas 304 and 306 are used to receive input and/or display output relevant to application 120 in question.

Fewer (or no) or additional application display areas may be provided, the number of areas (and particular layout/content/functionality thereof) being dependent on the application in question. Further, the size and positioning of the initial media selection interface and application display area(s) may differ to that illustrated.

As one example, application 120 may be a design creation application which allows users to select media items (via the initial media selection interface 302) which are then used by the application to create designs (which are displayed in display area 304). In this case, display area 306 may be used to display various templates/layouts offered by the application which can be selected by a user. Example of such an application are described in Australian patent application 2020260557, titled "System and method for content driven design generation", filed on 30 Oct. 2020 and Australian patent application 2020260558, titled "System and method for content driven design generation" filed on 30 Oct. 2020, the contents of which are incorporated herein by reference in their entirety.

As another example, application 120 may be a communications application which allows users to select media items (via the initial media selection interface 302) which are then included in or attached to a communication by the application. In this case, an application display area such as 304 and/or 306 may be used by the application to display the communication being generated (e.g. an email composition interface, an instant message composition interface, an SMS composition interface) and/or display other information.

Application 120 may be an alternative type of application which allows selection of media items via initial media selection interface 302 for alternative reasons.

The initial media selection interface 302 displays a first set of media item representations 308 (also referred to as the first set for short).

In most cases, not all representations 310 in the first set 308 are/can be displayed concurrently (i.e. the number of representation 310 in the first set 308 exceeds the space provided for displaying the first set 308). In this case the representations 310 of the first set 308 are displayed in a series of pluralities. For example, in FIG. 3 a first plurality 308A (or initially displayed plurality in this case) of representations from the first set 308 is displayed, the first plurality including three fully displayed representations (310A, 310B, 310C) and one partially displayed representation (310D); in FIG. 4 a second plurality 308B of representations from the first set 308 is displayed, the second plurality including four fully displayed representations (310J, 310K, 310L, 310M) and two partially displayed representations (310I and 310M); in FIG. 5 a third plurality 308C of representations from the first set 308 is displayed, the third plurality including three fully displayed representations (310R, 310S, 310T) and one partially displayed representation (310Q).

Figure 6:
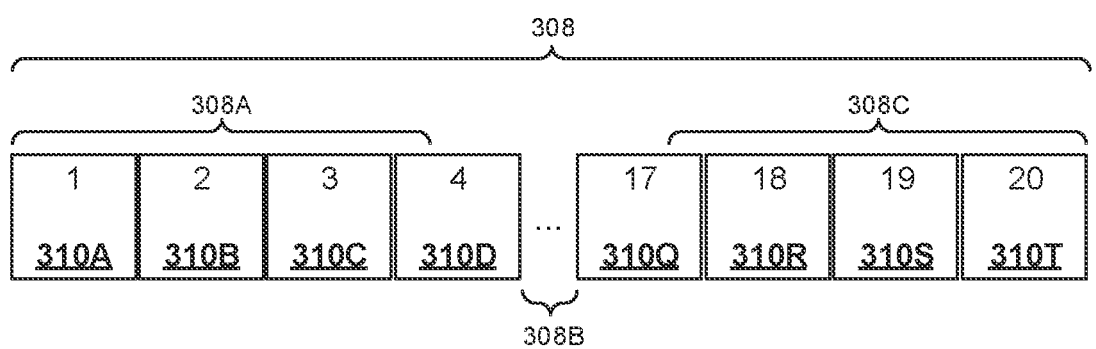
FIG. 6 depicts a first set of media item representations.

A depiction of the first set 308 is provided in FIG. 6. In this example the first set 308 includes twenty representations, 310A to 310T.

The representations 310 in the first set 308 correspond to media items from a particular set of media items. The set of media items that the representations 310 in the first set 308 correspond to will be referred to as the associated set of media items. In the present embodiment, the associated set of media items is indicated by a set indicator 312 (in this case 'media folder'). The associated set of media items may be a default set, for example a 'recent photos' folder, a 'favourites' folder, or an alternative folder/set. Set indicator 312 may be a control that can be activated by a user to select a different media set (and cause a different set of thumbnails 308 to be displayed). Where system 100 stores all media items in a single set there will be no need for a set indicator 312.

The representations 310 in the first set 308 are displayed in media item order as described above—e.g. reverse chronological order. For example, in the first set 308 depicted in FIGS. 3 to 5 the order may be left-to-right such that representation 310A is earlier in the order than representation 310B, which is earlier in the order than representation 310C and so forth. Where the media item order is reverse chronological (latest timestamp to earliest time stamp) this would mean that the timestamp of representation 310A is later than that of representation 310B, which is later than that of representation 310C, etc.

Media selection interface 302 is configured to detect representation transition inputs and, responsive thereto, transition display through the representations 310 in the first set 308. A representation transition input may be a display later-in-order representations input (which, unless the last-in-order representation is already displayed, causes representations occurring later in the media item order to be displayed) or a display earlier-in-order representations input (which, unless the first-in-order representation is already displayed, causes representations occurring earlier in the media item order to be displayed).

Figure 4:
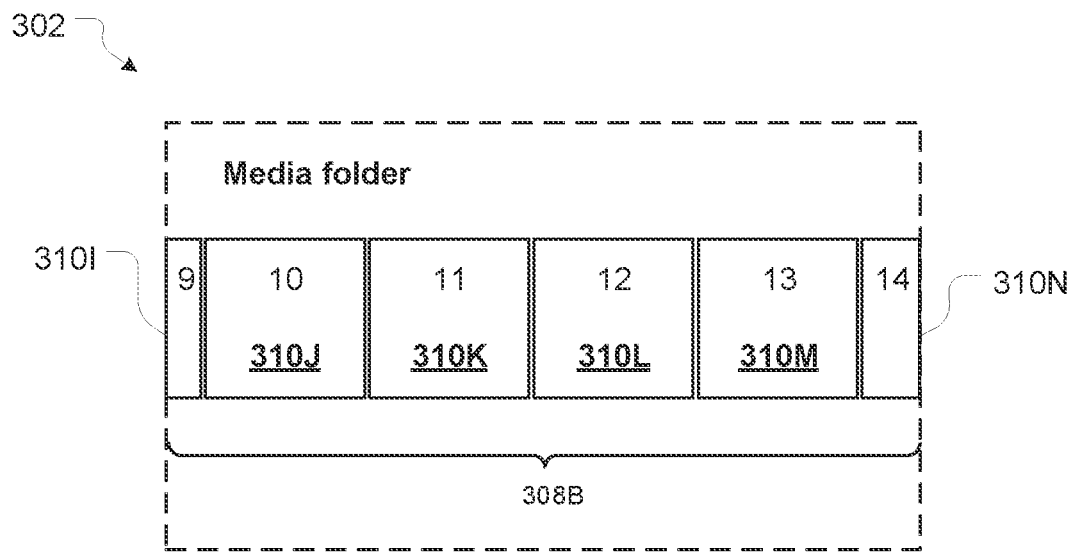
FIGS. 4 and 5 provide further depictions of the example initial media selection interface shown in FIG. 3.
Figure 5:
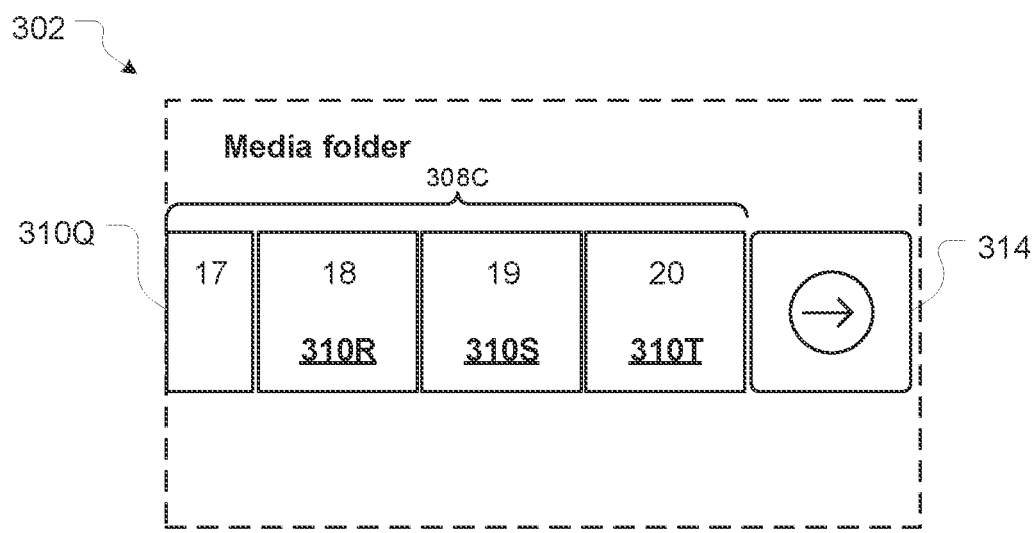

For example, as noted in FIG. 3 a first/initially displayed plurality 308A of representations is displayed. On detecting a display later-in-order representations input, application 120 may display a second plurality 308B of representations as shown in FIG. 4. From the initial media selection interface 302 as shown in FIG. 4: detecting another display later-in-order representations input may cause application 120 to display a third plurality 308C of representations as shown in FIG. 5; conversely, detecting a display earlier-in-order representations input may cause application 120 to re-display the first plurality 308A of representations as shown in FIG. 3.

In the illustrated embodiment, the representations 310 in the first set 308 are displayed in an array or linear sequence. In the particular example the array is a horizontal array with earlier-in-order representations 310 displayed to the left of later-in-order representations. In this case, and by way of example: a display later-in-order representations input may be a leftward directed swipe gesture; and a display earlier-in-order representations input may be a rightward directed swipe gesture.

In alternative embodiments representations 310 in the first set 308 may be displayed in different arrangements, for example a vertical array/linear sequence, a grid-type arrangement, or an alternative arrangement. Relevantly, regardless of the arrangement the media item representations 310 in the first set 308 are displayed in the media item order.

Alternative and/or additional representation transition inputs for transitioning through the representations 310 in the first set 308 may be provided. For example alternative touchscreen gestures may be provided, and/or dedicated user input controls (e.g. forward/back navigation arrows or the like) displayed on the display 202.

The number of media item representations 310 included in the first set 308 is limited to a defined maximum number of representations, n. In the example depicted in FIGS. 3 to 6, n=20. Maximum number n may be a defined constant, for example, n=10, n=15, n=20, n=25, n=30, or any other constant. Alternatively, n may be calculated based on the number of media items in the associated set of media items (e.g. n=0.1*total number of media items in the associated set of media items).

Typically, the maximum number n will be less than the total number of media items in the corresponding set of media items. In this case, the representations 310 in the first set 308 will correspond to a subset of the media items in the associated set of media items. By way of more specific example, if the defined maximum number of representations is n=20, and the relevant set of media items includes >n media items (e.g. 50, 100, 1000, 10000), the set 308 will still only include 20 media item representations 310. Conversely, if n=20, and the relevant set of media items includes <n media items (e.g. 19, 15, 5, 0), the set 308 will include representations 310 corresponding to all media items in the associated set of media items.

Activation of a media item representation 310 in the first set of media item representations 308 (e.g. via contacting or otherwise selecting the media item representation 310) causes the corresponding media item to be selected for the underlying application 120.

As described further below, while displaying the initial media selection interface 302, application 120 is configured to detect and respond to a display complete media set at reference input. While displaying the initial media selection interface 302, application 120 may also be configured to detect and respond to a display complete media set at start input. Detection of either type of display complete media set input causes a complete media selection interface to be displayed.

In the media selection interface 302 depicted in FIGS. 3 to 5, a display complete media set at reference control 314 (see FIG. 5) is provided, activation of which is a display complete media set at reference input. In this example a display complete set at start control 316 (see FIG. 3) is also provided, activation of which is a display complete media set at start input.

In this example, the display complete media set at reference control 314 is only displayed while the last-in-order representation (in this case 310T) of the first set 308 is displayed. E.g., in FIG. 5 the display complete media set at reference control 314 is displayed after the last-in-order representation 310T, once that representation has been reached (e.g. via one or more representation transition inputs).

In this example, the display complete media set at start control 316 is only displayed while the first-in-order representation (in this case 310A) of the first set 308 is displayed. E.g., in FIG. 1 the display complete media set at start control 316 is displayed before the first-in-order representation 310A—e.g. on initial display of the initial media selection interface 302 and/or after representation transition inputs that transition/return to the start of the first set 308.

Complete Media Item Selection Interface

As noted, detection of either a display complete media set at reference input or a display complete media set at start input (where provided for) causes a complete media selection interface to be displayed. As discussed below, however, the initial display state of the complete media selection interface differs depending on the particular display complete media set input detected.

Figure 7:
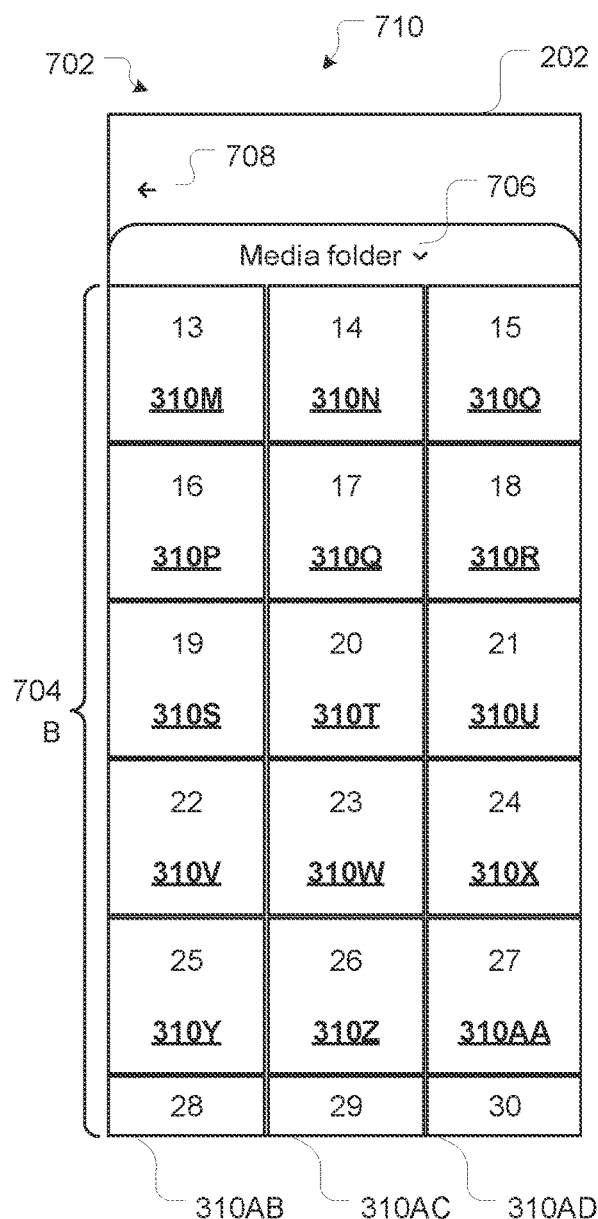
FIGS. 7 and 8 provide depictions of an example complete media selection interface.
Figure 8:
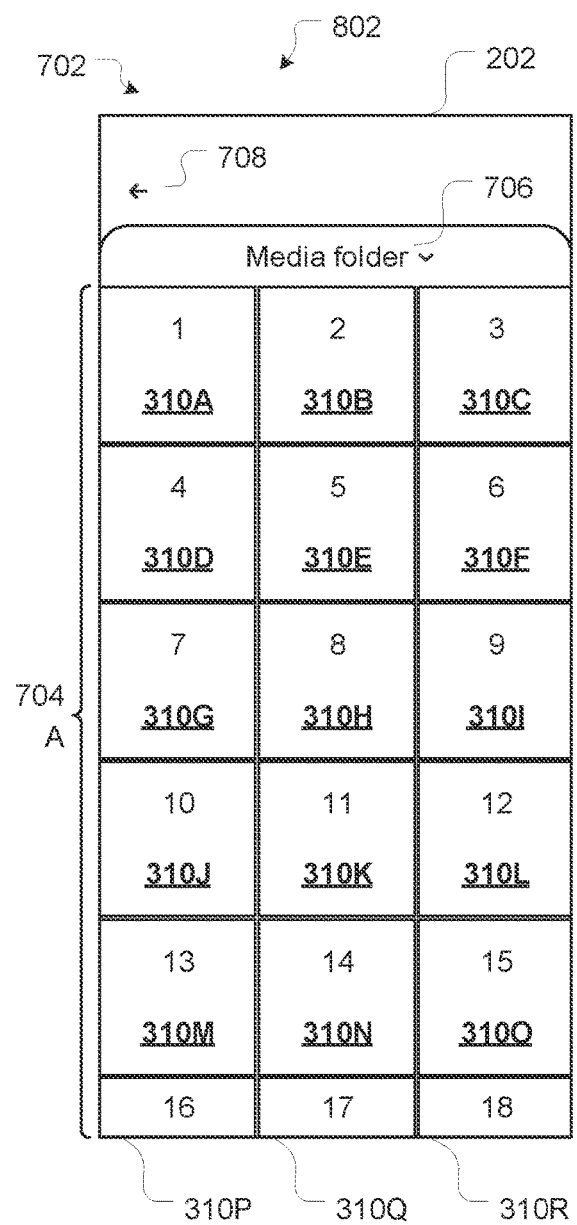

FIGS. 7 and 8 provide depictions of a complete media selection user interface 702, FIG. 7 in a first initial state 710 and FIG. 8 in a second initial state 802.

The complete media selection user interface displays a second set of media item representations (also referred to as the second set). Reference 704 is used to indicate the second set, however the entire second set is not shown. In FIG. 8 a first plurality 704A of the second set 704 is depicted and in FIG. 7 a second plurality 704B of the second set 704 is depicted. In this example the second set 704 includes at least 30 media items (to which representations 310A to 310AD correspond), however may well include more media items.

The second set 704 includes representations 310 for all media items in the associated set of media items (i.e. the set of media items associated with the first set 308 displayed in the initial media item selection interface 302). Accordingly, while the first set 308 (as displayed in the initial media selection interface 302) will typically include media item representations corresponding to only a subset of the media items in the associated set of media items, the second set 704 (as displayed in the complete media selection interface 702) includes representations 310 corresponding all media items in the associated set of media items.

As with the initial media selection interface 302, the representations 310 in the second set 704 are displayed in the media item order. In this particular example the order is left to right and top to bottom: i.e. representation 310M is earlier in the order than representation 310N, which is earlier in the order than representation 310O, which is earlier in the order than representation 310P, etc. For example, therefore, if the media item order is reverse chronological then in order of timestamp (most recent to oldest) the representations 310 are: 310M, 310N, 310O, 310P, . . . , 310AC, 310AD, etc. Alternative arrangements and orderings are possible.

Also as with initial media selection interface 302, it will typically be the case that not all representations 310 in the second set 704 will be able to be displayed concurrently. In this case representation transition inputs (similar to or the same as those described above) are used to transition through the representations 310 in the second set 704. For example, an upwardly directed swipe gesture may be a display later-in-order representations input and cause further representations that are later in the media item order to be displayed (unless the end/last-in-order representation 310 of the second set 704 has been reached) while a downwardly directed swipe gesture may be a display earlier-in-order representations input and cause further representations that are earlier in the media item order to be displayed (unless the start/first-in-order representation 310 of the second set 704 has been reached). Once again, alternative gestures and/or use of displayed controls may be used.

As with the initial media selection interface 302, activation of a media item representation 310 in the second set 704 causes the corresponding media item to be selected for the underlying application 120.

In the present example, the complete media selection user interface 702 also includes a media set indicator 706, the purpose/operation of which is similar to or the same as set indicator 312 in the initial media selection interface.

In the present example, the complete media selection user interface also includes a back control 708 which, if activated, causes the initial media selection interface 302 to be displayed (at the state it was in when a display complete media set input was detected by the application 120.

Display Complete Media Set Operations

As noted, detection of either a display complete media set at reference input (e.g. via a control such as 314) or (where provided) a display complete media set at start input (e.g. via a control such as 316) cause application 120 to display a complete media selection user interface 702.

The initial state of the complete media selection user interface 702, however, and in particular the initially displayed media item representations 310, is varied depending on the particular input.

When application 120 detects a display complete set at reference input, application 120 determines what will be referred to as a reference media item representation (also referred to as a reference representation).

The reference representation is the representation 310 that is the latest—in order currently displayed representation 310: i.e. the representation 310 that is: displayed in the initial media item selection interface 302 at the time the display complete set at reference input is detected; and is the latest-in-order representation 310 of the representations 310 that are displayed in the initial media item selection interface 302 at the time the display complete set at reference input is detected.

For example, where the media item order is reverse chronological the reference representation 310 will be the currently displayed representation having the oldest timestamp.

As a more specific example, where the first set 308 is displayed in a horizontal left-to-right array as per FIGS. 3 to 5, the reference representation 310 will be the rightmost displayed representation—for example representation 310T in FIG. 5.

Detection of a display complete set at reference input causes the second set of media item representations 704 to be displayed in a first initial state, such as 710 shown in FIG. 7.

In the first initial state, the initially displayed plurality 704B of representations 310 is selected based on the reference representation. In the illustrated examples, the initially displayed plurality 704B of the first initial state includes the reference representation as determined on detection of the display complete set at reference input.

For example, in FIG. 5 the latest-in-order displayed representation 310 (and thus reference media item representation) is representation 310T. Accordingly, detection of a display complete set at reference input while the initial media selection interface 302 is in the state depicted in FIG. 5 may result in the complete media selection user interface 702 depicted in FIG. 7 being displayed as the first initial state thereof. In FIG. 7, media item representation 310T is currently displayed.

In this particular example, the reference representation is displayed in a central (or roughly central) position in the initially displayed plurality of the second set 704. In alternative embodiments the reference representation could be displayed in alternative positions. For example, and keeping with the grid arrangement depicted in FIG. 7, the reference representation could be displayed at a top-left of the grid or an alternative position in the grid.

Including the reference representation in the initially displayed plurality 704B may be useful to provide a user with context (i.e. so they have an idea where in the media order they are). In still further examples, however, the reference representation may not be displayed at all in the initially displayed plurality 704B. For example, the initially displayed plurality 704B of the second set 704 may be generated to start at the next-in-order representation to the reference representation. I.e. in this example the reference representation is 310T, so the initially displayed plurality 704B could start at next-in-order representation 310U (with 310U appearing first, e.g. at the top-left corner) and continue from there.

In contrast, detection of a display complete set at start input causes the second set 704 to be displayed in a second initial state 802 (an example of which shown in FIG. 8). In the second initial state, the initially displayed plurality 704A of representations 310 includes the earliest-in-order representation 310 (in this example representation 310A).

Typically, the first initial state 710 will be different to the second initial state 802. Taking the illustrated user interfaces as an example, in the first initial state 702 depicted in FIG. 7, the earliest-in-order media item representation visible is representation 310M (and, therefore, in the first initial state representations 310A to 310L are not initially displayed). In the second initial state 802 depicted in FIG. 8, however, representations 1 to 18/310A to 310R are initially displayed.

The first and second initial states of the complete media selection interface 702 may not always be different, however. As one example, if the complete set of media items only included 5 media items (all of which can be concurrently displayed in the complete media selection interface 702) the first and second initial states would be the same.

Displaying the second set of media item representations 704 in the first initial state (which is based on the reference representation) provides a number of advantages.

From a user perspective it means that the user will not need to re-transition through media item representations that have already been previewed in the initial media selection interface 302. Rather, they can immediately view representations corresponding to the rest of the set of media items. This, in turn, has advantages from a computational processing perspective. If a user elects to view the complete media selection interface 702 it is unlikely that (at least initially) they will want to view media item representations that they have already seen in the initial media selection interface 302. Therefore, by maintaining the media item order but providing an initial display state in which the reference representation (i.e. the latest-in-order representation that was displayed/viewed in the initial media selection interface) there is no need to display and transition through media item representations that have already been displayed and viewed by the user.

To illustrate this, consider a user who, in the initial media selection interface 302, transitions through all representations in the first set 308 (e.g. twenty representations 310A to 310T) then elects to view representations of all media items in the set (e.g. the second set 704 in the present context). If the user was presented with the interface as depicted in FIG. 8, only representations 310A to 310O are fully displayed. These are, however, representations the user has already viewed and (at least on an initial decision) decided not to select. Accordingly, the processing performed and power spent displaying these representations could have been saved.

In contrast, by presenting the user with the interface depicted in FIG. 7 the user is immediately presented with representations they have not yet viewed (e.g. 310U to 310AA), and therefore the user does not need to re-transition through all of the already viewed representations (e.g. 310A to 310L in this particular example).

Alternative Display Complete Media Set Inputs

In the embodiment of FIGS. 3 to 5 the display complete set at reference input is activation of a display complete set at reference control 314, and the display complete set at start input is activation of a display complete set at start control 316.

Alternative display complete set inputs are possible.

Figure 9:
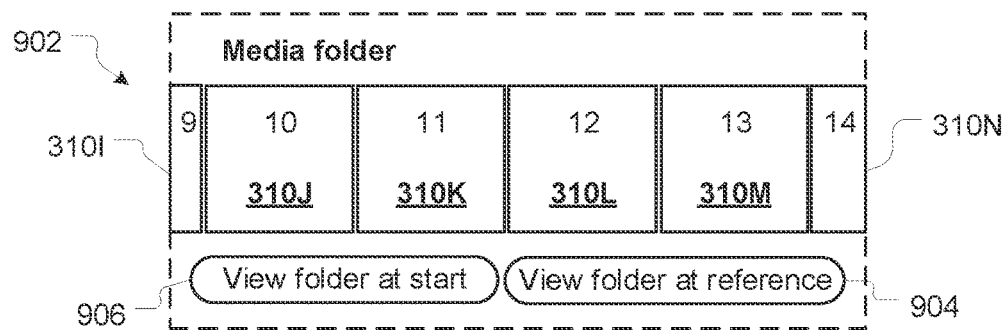
FIG. 9 depicts an alternative initial media selection interface.

FIG. 9 provides one example of an alternative initial media item selection interface 902. In interface 902, a display complete media set at reference control 904 is a permanently displayed control labelled (in this example) 'View folder at reference' and a display complete media set at start control 906 is a permanently displayed control labelled (in this example) 'View folder at start'.

If the display complete media set at reference control 904 is activated at the state shown in FIG. 9, application 120 may be configured to determine the reference representation to be either: the latest-in-order fully displayed representation (which, in FIG. 9, would be representation 310M), or the latest-in-order partially displayed representation (which, in FIG. 9, would be representation 310N).

Figure 10:
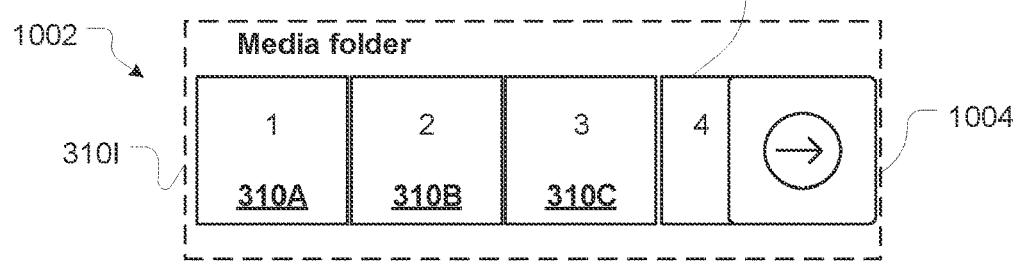
FIGS. 10 and 11 depict a further alternative initial media selection interface.
Figure 11:
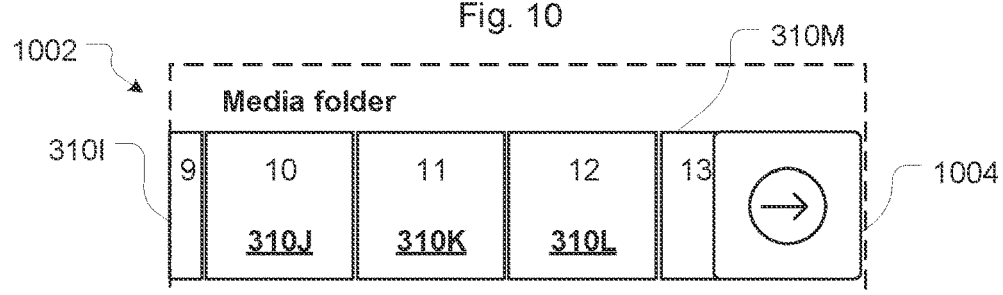

FIGS. 10 and 11 provide further examples of an alternative initial media selection interface 1002. In these examples a display complete set at reference control 1004 is permanently displayed at the right-hand end of the currently displayed plurality of the first set 308. In this particular example, when transitioning through the representations 310 of the first set 308 to display later-in-order representations, the representations are animated to appear to slide beneath or disappear behind the display complete set at reference control 1004. In this embodiment, no display complete set at start control is provided/displayed.

If the display complete media set at reference control 1004 is activated at the state shown in FIG. 11, application 120 may be configured to determine the reference representation to be either: the latest-in-order fully displayed representation (310L in FIG. 11); or the latest-in-order partially displayed representation (310M in FIG. 11).

Figure 12:
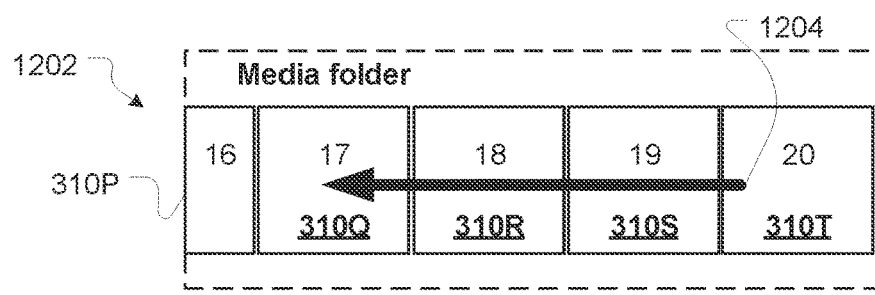
FIGS. 12 and 13 depict a further alternative initial media selection interface.
Figure 13:
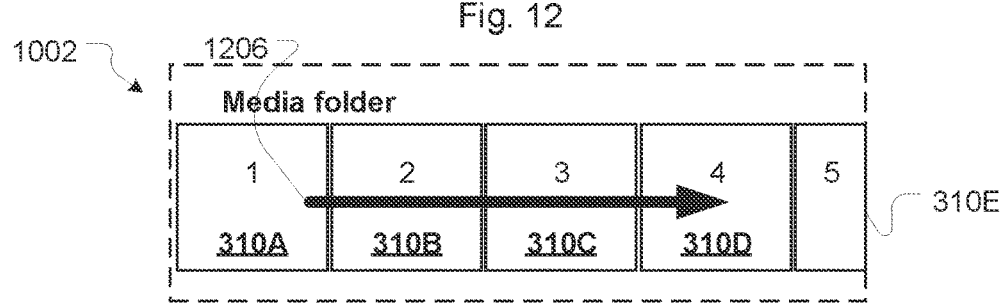

FIGS. 12 and 13 provide a further example of an alternative initial media selection interface 1202. In this example, the display complete set at reference input is a gesture 1204 made without reference to any displayed control. In this example, the first set 308 is displayed in a left-to-right horizontal array, and gesture 1204 is a leftward directed swipe gesture detected while the last-in-order representation 310 of the first set 308 (in this case media item 310T) is displayed.

Similarly, in interface 1202, the display complete set at start input is a gesture 1206 made without reference to any displayed control. In this example, the first set 308 are displayed in a left-to-right horizontal array, and gesture 1206 is a rightward directed swipe gesture made while the first-in-order representation 310 of the first set 308 (in this case media item 310A) is displayed.

Media Selection Method

Figure 14:
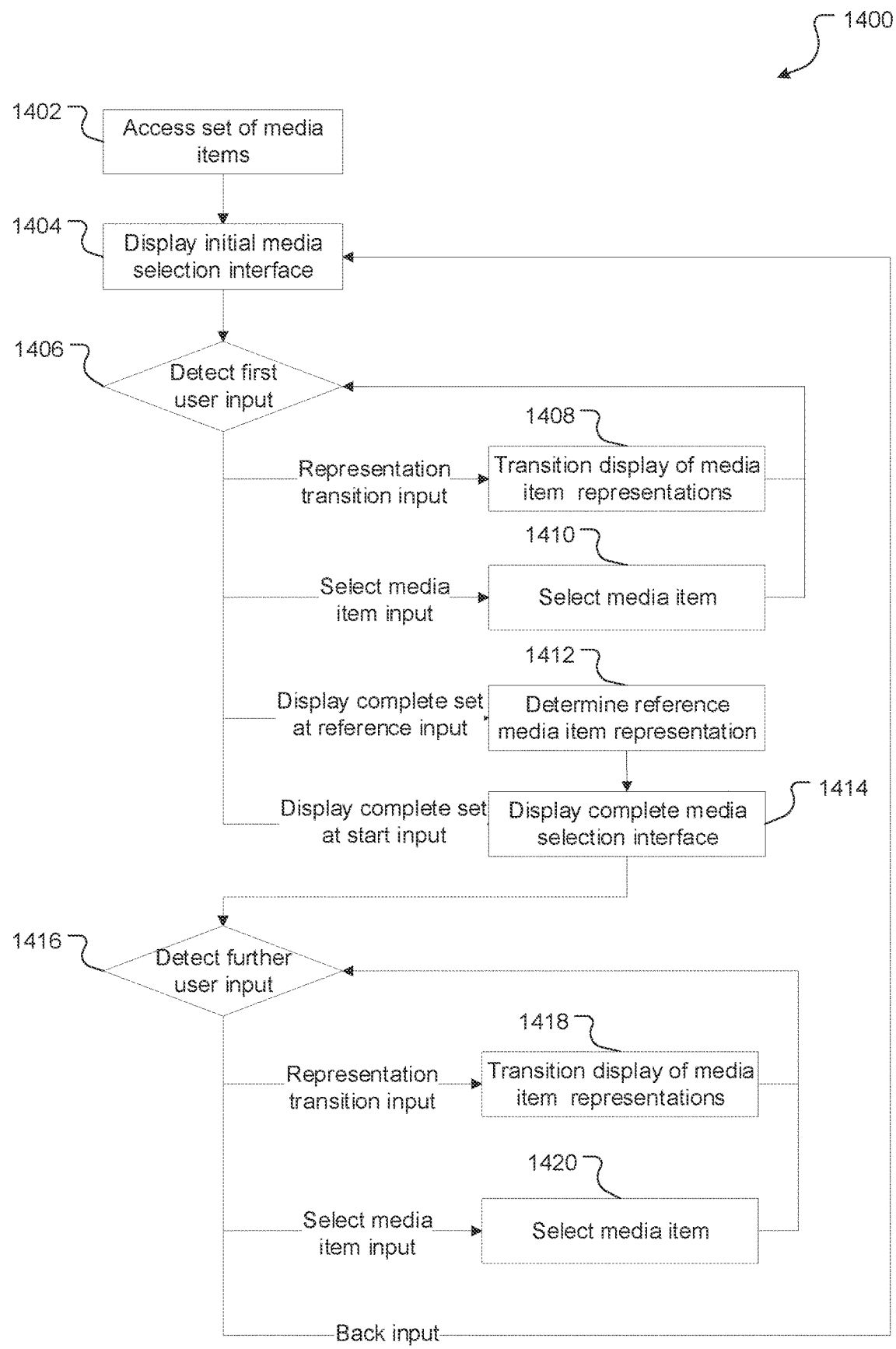
FIG. 14 is a flowchart depicting operations performed in a media item selection process.

Turning to FIG. 14, a computer implemented method 1400 for selecting media items will be described.

Method 1400 is performed when one or more media items are to be selected for use by an application 120 running on a system such as computer system 100. Computer system 100 is configured to perform method 1400 by execution of computer readable instructions by a processing unit such as 102. The computer readable instructions that cause the method to be implemented may be part of the application that is to use the selected media items itself (e.g. application 120). Alternatively, the computer readable instructions may be part of another application (e.g. an operating system or alternative application) which is invoked by the application that needs to receive selection of one or more media items by a user.

Method 1400 will be described with reference to the user interfaces described above as examples. It will be appreciated, however, that the method may be performed with different user interfaces.

At 1402, application 120 accesses a set of media items.

The set of media items may be locally stored media items accessed, for example, from a local non-transitory memory such as 110. Alternatively, the set of media item items may include media items stored on remote devices, for example external storage devices (such as hard drives or the like accessible via wired or wireless connection) or servers (accessible over network 118).

The set of media items may be a default set of media items, for example media items in a 'recent photos' folder, a 'favourites' folder, or an alternative default set. Alternatively, the set of media items may be a user selected set of media items (for example a user selected media item folder).

At 1404, application 120 causes an initial media selection interface (such as 302 described above) to be displayed.

The initial media selection interface 302 includes a first set of media item representations 308. The first set 308 includes media item representations 310 corresponding to media items in the set of media items accessed at 1402. The representations 310 in the first set 308 need not all be displayed concurrently.

The representations 310 in the first set 308 are displayed in a media item order (e.g. reverse chronological order).

Application 120 is configured such that the first set 308 includes a maximum number of representations.

Where the maximum number of representations is less than the number of media items in the associated set of media items, the first set 308 represents a subset of media items in the associated set of media items.

The following pseudo Swift code provides one example of how application 140 may access the first set 308 of media item representations:

```
photoLibrary.getCollection(collection: ALBUM_USER_LIBRARY,
completion: {
results in
  updateUserPhotosUI(with: results, limit: 20);
});
```

While the initial media interface 302 is displayed, application 120 is configured to detect a display complete set at reference input. The display complete set at reference input may be activation of a display complete set at reference control such as 314. In this case, the display complete set at reference control 314 may, though need not, be always displayed. For example, the first set of media item representations 308 may be displayed in an array and the display complete set at reference control 314 may be displayed at one end of the array, after a last-in-order media item representation of the first set 308.

While the initial media interface 302 is displayed, application 120 may be configured to detect a display complete set at start input. The display complete set at start input may be activation of a display complete set at start control 316. Where included, the display complete set at start control 316 may, though need not, always be displayed. For example, the first set 308 may be displayed in an array and the display complete set at start control 316 may be displayed at an opposite end of the array, before a first-in-order media item representation of the first set 308.

At 1406, application 120 detects a user input (referred to as a first user input for reference). For present purposes the first user input may be: a representation transition input (in which case processing proceeds to 1408); a select media item input (in which case processing proceeds to 1410); a display complete set at reference input (in which case processing proceeds to 1412); or a display complete set at start input (in which case processing proceeds to 1416). Alternative inputs may, of course, be possible—for example closing the application 120 or interacting with application 120 in another way (e.g. via an application display area such as 304 or 306).

At 1408, on detecting a representation transition input, application 120 causes the media item representations 310 to transition in accordance with the detected input. Processing then returns to 1406.

The representation transition input may, for example, be input causing application 120 to display one or more later-in-order representations 310. This may, for example, be a leftward directed gesture detected while the last-in-order representation (e.g. 310T) is not already displayed. Alternatively, the representation transition input may be input causing application 120 to display one or more earlier-in-order representations 310. This may, for example, be a rightward directed gesture detected while the first-in-order representation (e.g. 310A) from the first set 308 is not already displayed. Alternative representation transition inputs are possible.

At 1410, on detecting a select media item input, application 120 selects the media item corresponding to the selected media item representation 310. Following this processing may return to 1406 (e.g. for selection of further media items) or proceed to alternative processing performed by the application 120 in light of the selection (not shown).

The select media item input may be selection/activation of a particular representation 310 which causes selection of the media item to which the particular representation corresponds.

At 1412, on detecting a display complete set at reference input, application 120 determines a reference media item representation. Following this, processing proceeds to 1414.

The display complete set at reference input may be activation of a display complete set at reference control such as 314, 904, or 1004 as described above. Alternatively, the display complete set at reference input may be a gesture such as 1204 as described above.

As described above, application 120 determines the reference media item representation 310 to be the latest-in-order media item representation 310 that is currently displayed.

At 1414, application 120 displays a complete media selection interface such as interface 702 described above.

The complete media selection interface 702 includes a second set of media item representations 704. The second set 704 includes representations 310 that correspond to all media items in the associated set of media items. The representations 310 in the second set 704 need not all be displayed at the same time.

The representations 310 in the second set 704 are displayed in the media item order (e.g. reverse chronological order).

When displayed in response to detection of a display complete set at reference input, the complete media selection interface 702 is displayed in a first initial display state. The first initial display state is a display state in which an initially displayed plurality 704B of the second set 704 is based on the reference media item representation 310 determined at 1412 (e.g. 310T in the example above). The initially displayed plurality 704B of the second set 704 may include the reference media item representation.

The following pseudo Swift code provides one example of how application 140 may display the second set of media item representations 704 taking into account the reference media item representation that has been identified:

```
photoLibrary.getCollection(collection: ALBUM_USER_LIBRARY,
completion: {
results in
    updateUserPhotosUI(with: results, scrollToIndex:
self.indexOf(selectedMediaItem));
});
```

When displayed in response to detection of a display complete set at start input, the complete media selection interface 702 is displayed in a second initial display state. The second initial display state is a display state in which an initially displayed plurality of the second set of media item representations includes the first-in-order media item representation (e.g. 310A in the example above).

The following pseudo Swift code provides one example of how application 140 may display the second set 704 of media item representations that includes the first-in-order media item representation:

```
photoLibrary.getCollection(collection: ALBUM_USER_LIBRARY,
completion: {
results in
    updateUserPhotosUI(with: results, scrollToIndex: 0);
});
```

Following display of the complete media selection interface at 1414 processing proceeds to 1416.

At 1416, while the complete media selection interface 702 is displayed, application 120 detects further user input.

For example, the further user input may be a representation transition input, in response to which (at 1418) application 120 causes alternative media item representations 310 from the second set of media item representations 704 to be displayed. This may be similar to processing 1408 described above.

The further user input may be a select media item input, in response to which (at 1420) application 120 selects a media item (corresponding to a selected media item representation 310) for use by the application 120. This may be similar to processing 1410 described above.

The further user input may be a back input (for example by activation of a control such as 708), in response to which application 120 causes the initial media selection interface 302 to be displayed (instead of the complete media selection interface 702).

The further user input may be an alternative user input.

The embodiments described above refer to activation of touchscreen controls. Activation of a touchscreen control may be achieved by contacting the touchscreen display with a finger, stylus, or other object (depending on the touchscreen technology) at a position at which the control is selected. Where a touchscreen display is not used, activation of a control may by alternative means, for example by use of a pointing device (e.g. positioning a pointer using a mouse or the like and clicking the mouse button), a keyboard (e.g. via arrows to move a cursor and a selection key, and/or keyboard shortcuts), or alternative means.

The flowchart of FIG. 14 as illustrated and described above defines operations in a particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
accessing a set of media items having a media item order;
displaying, in an initial media selection interface, a first plurality of media item representations in the media item order, the first plurality of media item representations taken from a first set of media item representations, each media item representation in the first set of media item representations corresponding to a media item from the set of media items;
while the initial media selection interface is displayed:
detecting a representation transition input;
in response to detecting the representation transition input, replacing display of the first plurality of media item representations with display of a second plurality of media item representations in the initial media selection interface, the second plurality of media item representations taken from the first set of media item representations;
detecting a display complete media set at reference input; and
in response to detecting the display complete media set at reference input:
determining a reference media item representation, wherein the reference media item representation is a media item representation that is displayed in the initial media selection interface at the time the display complete media set at reference input is detected, and is a latest-in-order media item representation when compared to other media item representations that are displayed in the initial media selection interface at the time the display complete media set at reference input is detected; and
displaying a complete media selection interface in a first initial display state, the complete media selection interface for displaying a second set of media item representations, the second set of media item representations displayed in the media item order and including media item representations corresponding to all media items in the set of media items, the first initial display state being a display state in which an initially displayed plurality of the second set of media item representations is based on the reference media item representation.

2. The computer implemented method of claim 1, wherein a maximum number of representations in the first plurality of media item representations is a defined constant or is determined based on a number of media items in the set of media items, and wherein the maximum number of representations in the first plurality of media item representations is less than a total number of media items in the set of media items.

3. The computer implemented method of claim 1, wherein:
the representation transition input is a display later-in-order media item representations input; and
the second plurality of media item representations includes at least one media item representation that has a later position in the media item order than the media item representations in the first plurality of media item representations.

4. The computer implemented method of claim 1, wherein:
the representation transition input is a display earlier-in-order media item representations input; and
the second plurality of media item representations includes at least one media item representation that has an earlier position in the media item order than the media item representations in the first plurality of media item representations.

5. The computer implemented method of claim 1, wherein the media item representations in the first set of media item representations are displayed in an array and the representation transition input is a swipe gesture.

6. The computer implemented method of claim 1, wherein the display complete set at reference input is activation of a display complete set at reference control displayed in the initial media selection interface.

7. The computer implemented method of claim 1, wherein the display complete set at reference control is a permanently displayed control in the initial media selection interface.

8. The computer implemented method of claim 1, wherein the media item order is reverse chronological order.

9. The computer implemented method of claim 1, further comprising:
receiving a media item selection input; and
in response to a media item selection input selecting a media item.

10. The computer implemented method of claim 9, wherein:
the media item selection input is an activation of a media item representation displayed in the initial media selection interface; and
the selected media item corresponds to the particular media item representation activated.

11. The computer implemented method of claim 9, wherein:
the media item selection input is an activation of a media item representation displayed in the complete media selection interface; and
the selected media item corresponds to the particular media item representation activated.

12. A computer processing system comprising:
a processing unit;
a display; and
non-transitory computer-readable storage medium storing instructions, which when executed by the processing unit, cause the processing unit to:
access a set of media items having a media item order;
display, on the display and in an initial media selection interface, a first plurality of media item representations in the media item order, the first plurality of media item representations taken from a first set of media item representations, each media item representation in the first set of media item representations corresponding to a media item from the set of media items;
while the initial media selection interface is displayed:
detect a representation transition input;
in response to detecting the representation transition input, replace display of the first plurality of media item representations with display of a second plurality of media item representations in the initial media selection interface, the second plurality of media item representations taken from the first set of media item representations;

detect a display complete media set at reference input; and in response to detecting the display complete media set at reference input:

determine, by the processing unit, a reference media item representation, wherein the reference media item representation is a media item representation that is displayed in the initial media selection interface at the time the display complete media set at reference input is detected, and is a latest-in-order media item representation when compared to other media item representations that are displayed in the initial media selection interface at the time the display complete media set at reference input is detected; and display a complete media selection interface in a first initial display state, the complete media selection interface for displaying a second set of media item representations, the second set of media item representations displayed in the media item order and including media item representations corresponding to all media items in the set of media items, the first initial display state being a display state in which an initially displayed plurality of the second set of media item representations is based on the reference media item representation.

13. The computer processing system of claim 12, wherein a maximum number of representations in the first plurality of media item representations is a defined constant or is determined based on a number of media items in the set of media items, and wherein the maximum number of representations in the first plurality of media item representations is less than a total number of media items in the set of media items.

14. The computer processing system of claim 12, wherein:

the representation transition input is a display later-in-order media item representations input; and the second plurality of media item representations includes at least one media item representation that has a later position in the media item order than the media item representations in the first plurality of media item representations.

15. The computer processing system of claim 12, wherein:

the representation transition input is a display earlier-in-order media item representations input; and the second plurality of media item representations includes at least one media item representation that has an earlier position in the media item order than the media item representations in the first plurality of media item representations.

16. Non-transitory computer-readable storage medium storing instructions, which when executed by a processing unit, cause the processing unit to:

access a set of media items having a media item order;

display, on a display and in an initial media selection interface, a first plurality of media item representations in the media item order, the first plurality of media item representations taken from a first set of media item representations, each media item representation in the first set of media item representations corresponding to a media item from the set of media items;

while the initial media selection interface is displayed:

detect a representation transition input;

in response to detecting the representation transition input, replace display of the first plurality of media item representations with display of a second plurality of media item representations in the initial media selection interface, the second plurality of media item representations taken from the first set of media item representations;

detect a display complete media set at reference input; and in response to detecting the display complete media set at reference input:

determine a reference media item representation, wherein the reference media item representation is a media item representation that is displayed in the initial media selection interface at the time the display complete media set at reference input is detected, and is a latest-in-order media item representation when compared to other media item representations that are displayed in the initial media selection interface at the time the display complete media set at reference input is detected; and display a complete media selection interface in a first initial display state, the complete media selection interface for displaying a second set of media item representations, the second set of media item representations displayed in the media item order and including media item representations corresponding to all media items in the set of media items, the first initial display state being a display state in which an initially displayed plurality of the second set of media item representations is based on the reference media item representation.

17. The non-transitory computer-readable storage medium of claim 16, wherein:

the representation transition input is a display later-in-order media item representations input; and the second plurality of media item representations includes at least one media item representation that has a later position in the media item order than the media item representations in the first plurality of media item representations.

18. The non-transitory computer-readable storage medium of claim 16, wherein:

the representation transition input is a display earlier-in-order media item representations input; and the second plurality of media item representations includes at least one media item representation that has an earlier position in the media item order than the media item representations in the first plurality of media item representations.

\* \* \* \* \*